United States Patent
Ko et al.

(10) Patent No.: US 8,514,714 B2
(45) Date of Patent: Aug. 20, 2013

(54) DEVICE AND METHOD FOR PROVIDING FORWARDING INFORMATION AND QOS INFORMATION IN FLOW BASED NETWORK ENVIRONMENT

(75) Inventors: Nam Seok Ko, Daejeon (KR); Soon Seok Lee, Daejeon (KR); Hyunjoo Kang, Daejeon (KR); Seong Moon, Daejeon (KR); Jong Dae Park, Daejeon (KR); Seungwoo Hong, Daejeon (KR); Kyeong Ho Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 220 days.

(21) Appl. No.: 12/899,310

(22) Filed: Oct. 6, 2010

(65) Prior Publication Data

US 2011/0080830 A1 Apr. 7, 2011

(30) Foreign Application Priority Data

Oct. 6, 2009 (KR) .......... 10-2009-0094782
Sep. 28, 2010 (KR) .......... 10-2010-0093951

(51) Int. Cl.
  *H04L 12/26* (2006.01)
(52) U.S. Cl.
  USPC ........ 370/235; 370/351; 370/389; 370/395.1; 370/395.3; 370/395.31; 370/428; 370/391

(58) Field of Classification Search
  None
  See application file for complete search history.

(56) References Cited

U.S. PATENT DOCUMENTS

| | | | |
|---|---|---|---|
| 6,574,195 B2 | 6/2003 | Roberts | |
| 6,768,738 B1 * | 7/2004 | Yazaki et al. | 370/392 |
| 6,977,932 B1 | 12/2005 | Hauck | |
| 2002/0071389 A1 | 6/2002 | Seo | |
| 2004/0202184 A1 | 10/2004 | Yazaki et al. | |
| 2007/0133559 A1 * | 6/2007 | Ko et al. | 370/395.21 |
| 2007/0268909 A1 | 11/2007 | Chen et al. | |
| 2011/0023088 A1 * | 1/2011 | Ko et al. | 726/3 |

FOREIGN PATENT DOCUMENTS

| | | |
|---|---|---|
| CN | 1359218 A | 7/2002 |
| CN | 1879359 A | 12/2006 |

* cited by examiner

*Primary Examiner* — Charles C Jiang
*Assistant Examiner* — Amy Ling

(57) ABSTRACT

A device for providing forwarding and QoS information in a flow based network environment acquires first information and second information from a flow table therein on the basis of status information of a predetermined flow in order to provide dynamically updated information in a flow based network environment. When it is determined that first information and second information acquired based on a route ID of a series of information are updated, the flow table is updated and the updated information is provided.

13 Claims, 7 Drawing Sheets

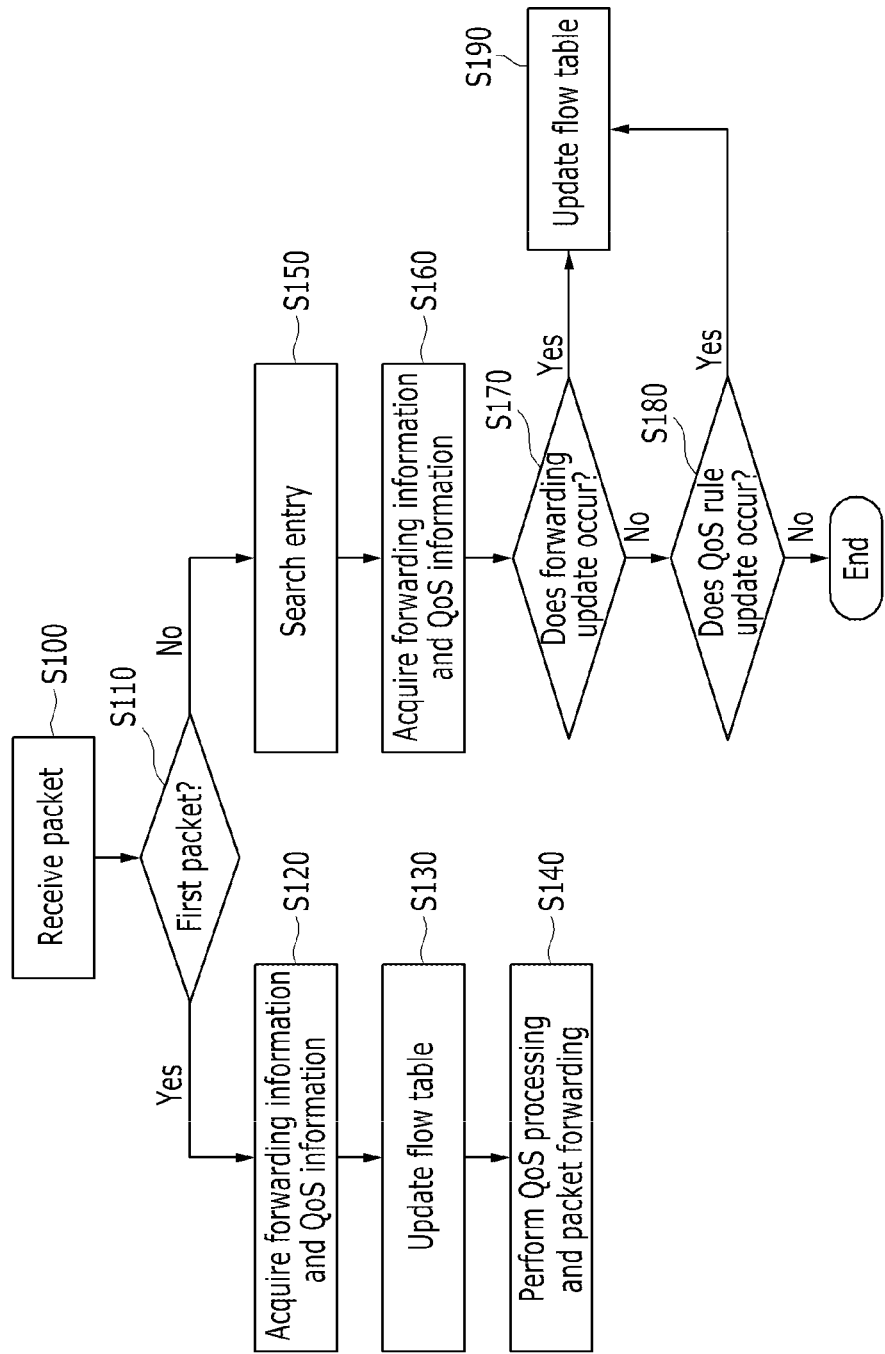

DEVICE AND METHOD FOR PROVIDING FORWARDING INFORMATION AND QOS INFORMATION IN FLOW BASED NETWORK ENVIRONMENT

CROSS-REFERENCE TO RELATED APPLICATION

This application claims priority to and the benefit of Korean Patent Application Nos. 10-2009-0094782 and 10-2010-0093951 filed in the Korean Intellectual Property Office on Oct. 6, 2009 and Sep. 28, 2010, the entire contents of which are incorporated herein by reference.

BACKGROUND OF THE INVENTION (a) Field of the Invention

The present invention relates to a device and a method for providing forwarding information and QoS information in a flow based network environment.

(b) Description of the Related Art

In general, when a first packet in a predetermined flow is inputted into a system on flow based network devices, forwarding information and QoS processing information need to be acquired for flow processing. The forwarding information may be extracted from various tables for determining a destination of an IP packet in addition to an IPv4 or IPv6 forwarding table in the case of an IP. On the contrary, the QoS processing information may be extracted from a plurality of traffic classifications tables.

Each flow may be mapped to a plurality of rules which exist in the plurality of traffic classification tables and if each flow is mapped to the plurality of rules, information on a rule having the most priority is used as information on a final flow. The extracted information is stored in a flow table which can store status information of the flow for each flow.

In regards to the flow in which the forwarding information and the QoS processing information are stored in the flow table, packet forwarding and QoS processing for packets that are consistently inputted after inputting the first packet are performed based on the forwarding information and the QoS processing information stored in the flow table. The forwarding information and QoS processing information that are updated after the first packet is inputted are not applied to the corresponding flow.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a device and a method for providing forwarding information and QoS information in a flow based network environment having advantages of dynamically applying the forwarding information and QoS processing information to the corresponding flow.

An exemplary embodiment of the present invention provides a method for providing forwarding information and QoS information in a flow based network environment that includes:

acquiring first information and second information from a flow table on the basis of status information of a flow;

determining whether or not the acquired first information and second information are updated on the basis of a route ID of information on a packet inputted for the flow; and updating the flow table when it is determined that the first information and the second information are updated.

Another exemplary embodiment of the present invention provides a device for providing forwarding information and QoS information in a flow based network environment that includes:

a table storing unit storing information for processing a packet for a flow and processing update information; and a forwarding engine unit determining whether or not an inputted packet is a firstly inputted packet and updating first information and second information on the basis of information previously stored in the table storing unit in accordance with the status of the inputted packet.

BRIEF DESCRIPTION OF THE DRAWINGS

FIG. 7 is a flowchart illustrating a method for providing forwarding information and QoS information in a flow based network environment according to an exemplary embodiment of the present invention.

DETAILED DESCRIPTION OF THE EMBODIMENTS

Figure 1:
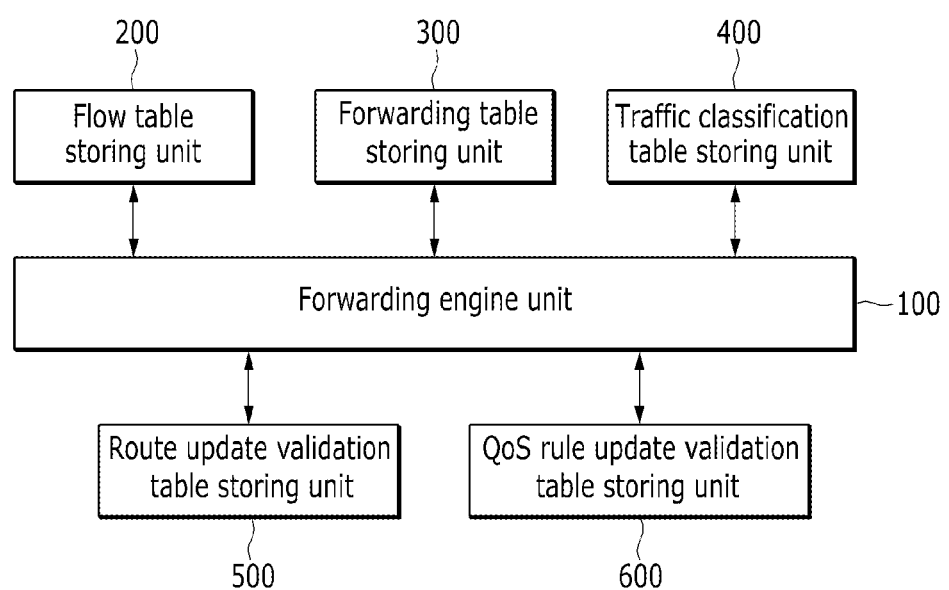
FIG. 1 is an exemplary diagram of a device for providing forwarding information and QoS information in a flow based network environment to which dynamic updates of forwarding information and a QoS rule are applicable according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising", will be understood to imply Hereinafter, a method for applying dynamic updates of forwarding and QoS rules on flow based network devices according to an exemplary embodiment of the present invention will be described with reference to the accompanying drawings.

FIG. 1 is an exemplary diagram of a device for providing forwarding information and QoS information in a flow based network environment to which dynamic updates of forwarding information and a QoS rule are applicable according to an exemplary embodiment of the present invention.

In general, a flow is constituted by 5-tuple information. However, in accordance with set-up by an operator or characteristics of application, another head information of an IP packet may be added or some fields may be subtracted from the 5-tuple information. This, as one exemplary embodiment, means that the flow may be defined by only an IP source address. In this case, the 5-tuple information generally includes an IP source address, an IP destination address, a protocol number, source transport layer port information, and destination transport port information.

As shown in FIG. 1, the device for providing forwarding information and QoS information in a flow based network environment that processes a packet depending on the application of the dynamic updates of forwarding information and QoS rule includes a forwarding engine unit 100, a flow table storing unit 200, a forwarding table storing unit 300, a traffic classification table storing unit 400, a route update validation table storing unit 500, and a QoS rule update validation table storing unit 600.

When a packet for a predetermined flow is inputted into the network device, the forwarding engine unit 100 determines whether or not the inputted packet is a firstly inputted packet. In order to verify whether or not the inputted packet is the first packet, the forwarding engine unit 100 uses the status information of the flow which is maintained in the flow table of the flow table storing unit 200.

That is, if the status information of the flow is not stored in the flow table of the flow table storing unit 200, the inputted packet means the first packet. Herein, the status information is described by using a serial number allocated to the packet as an example, but is not limited thereto.

In other words, the forwarding engine unit 100 verifies the status information of the packet, and searches the flow table stored in the flow table storing unit 200 and thereafter, verifies whether the verified status information is stored in the flow table. If the inputted packet is the first packet, the status information is not stored in the flow table and if the inputted packet is not the first packet, the status information is stored in the flow table.

In this case, the flow table stored in the flow table storing unit 200 will first be described with reference to FIG. 2.

Figure 2:
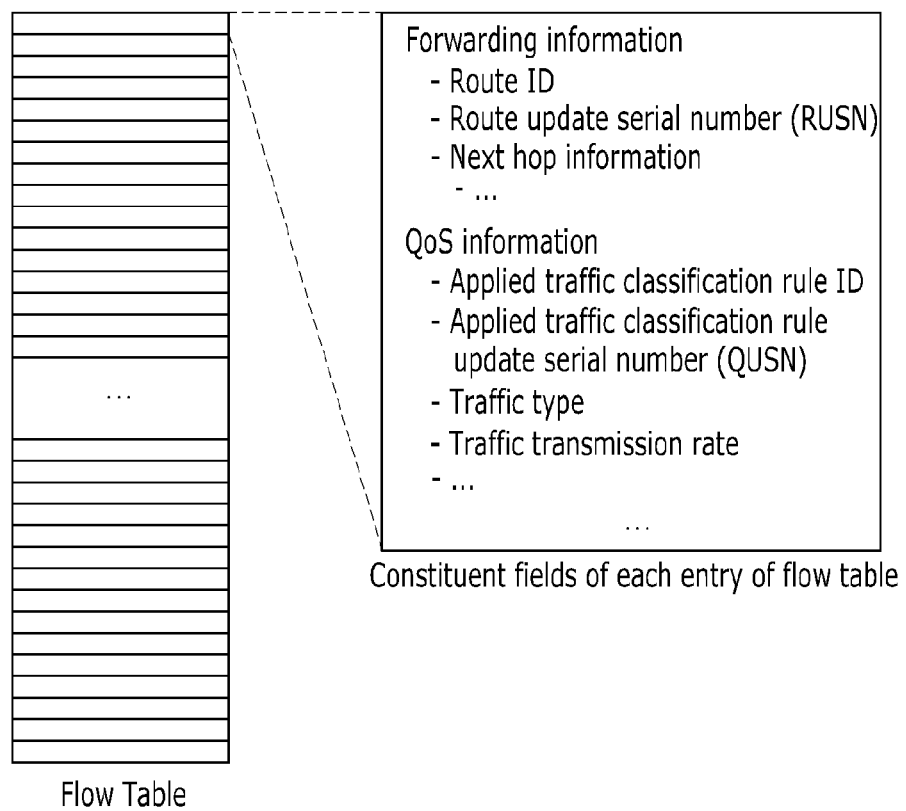
FIG. 2 is an exemplary diagram of a flow table according to an exemplary embodiment of the present invention.

FIG. 2 is an exemplary diagram of a flow table according to an exemplary embodiment of the present invention.

As shown in FIG. 2, the flow table according to the exemplary embodiment of the present invention may have various types of data structures including a tree data structure, a hash data structure, a direct table data structure, a ternary content addressable memory (TCAM), a structure in which various data structures are merged, and the like.

The flow table according to the exemplary embodiment of the present invention includes the forwarding information and the QoS information for processing a packet for a predetermined flow.

In this case, the forwarding information means information on a destination to which the packet should be transmitted and includes next hop information. The next hop information allows forwarding update to be dynamically processed in accordance with the exemplary embodiment of the present invention and includes a route ID and a route update serial number.

The QoS information as information on QoS to be applied to transmit the packet to the destination includes information including a traffic classification rule ID applied to the corresponding flow, an applied traffic classification rule update serial number, a traffic type, a traffic transmission rate, information on the bandwidth of the packet, priority information, and the like.

When the forwarding engine unit 100 of FIG. 1 will be continuously described, if the status information is not stored in the flow table, the packet for the inputted flow is firstly inputted. Accordingly, the forwarding engine unit 100 searches the forwarding table and the traffic classification table stored in the forwarding table storing unit 300 and the traffic classification table storing unit 400, respectively, and acquires the forwarding information and the QoS information and then stores and updates the acquired corresponding information together with the status information of the packet in the flow table.

For this, it will be described by assuming that predetermined prior information previously exists in the forwarding table and the traffic classification table. That is, regardless of the forwarding information and the QoS information which are information dynamically acquired by a routing protocol or information directly set by an operator, it is assumed that information is previously set by any method.

Herein, the forwarding table and the traffic classification table which are stored in the forwarding table storing unit 300 and the traffic classification table storing unit 400, respectively, will first be described with reference to FIGS. 3 and 4.

Figure 3:
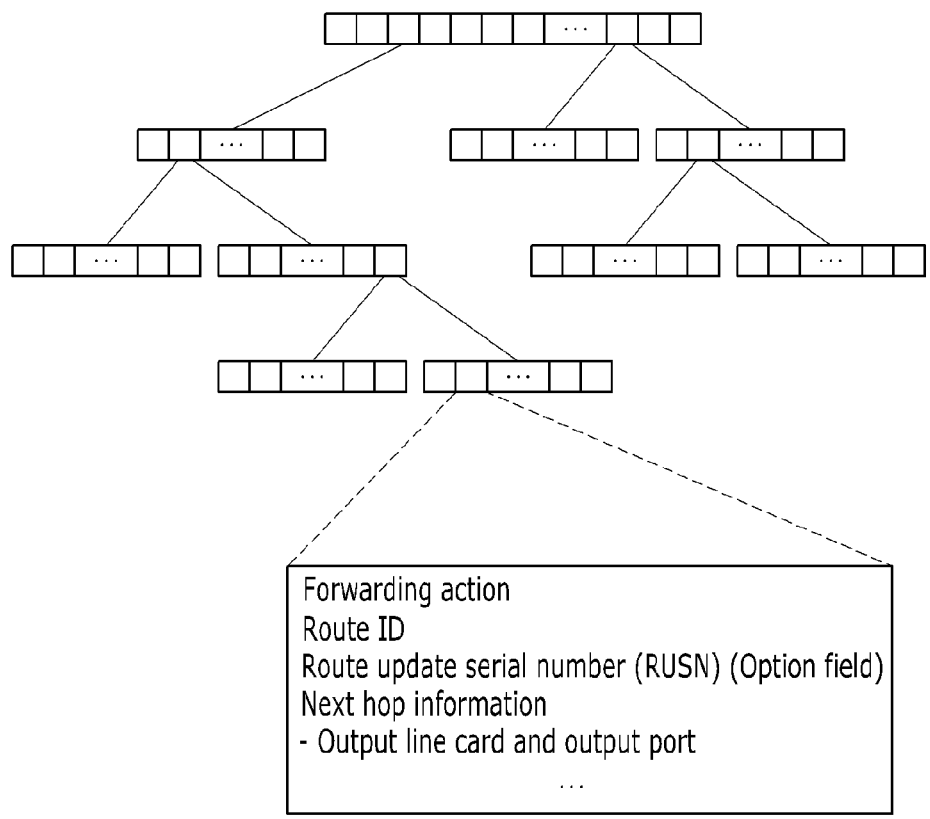
FIG. 3 is an exemplary diagram of a forwarding table according to an exemplary embodiment of the present invention.
Figure 4:
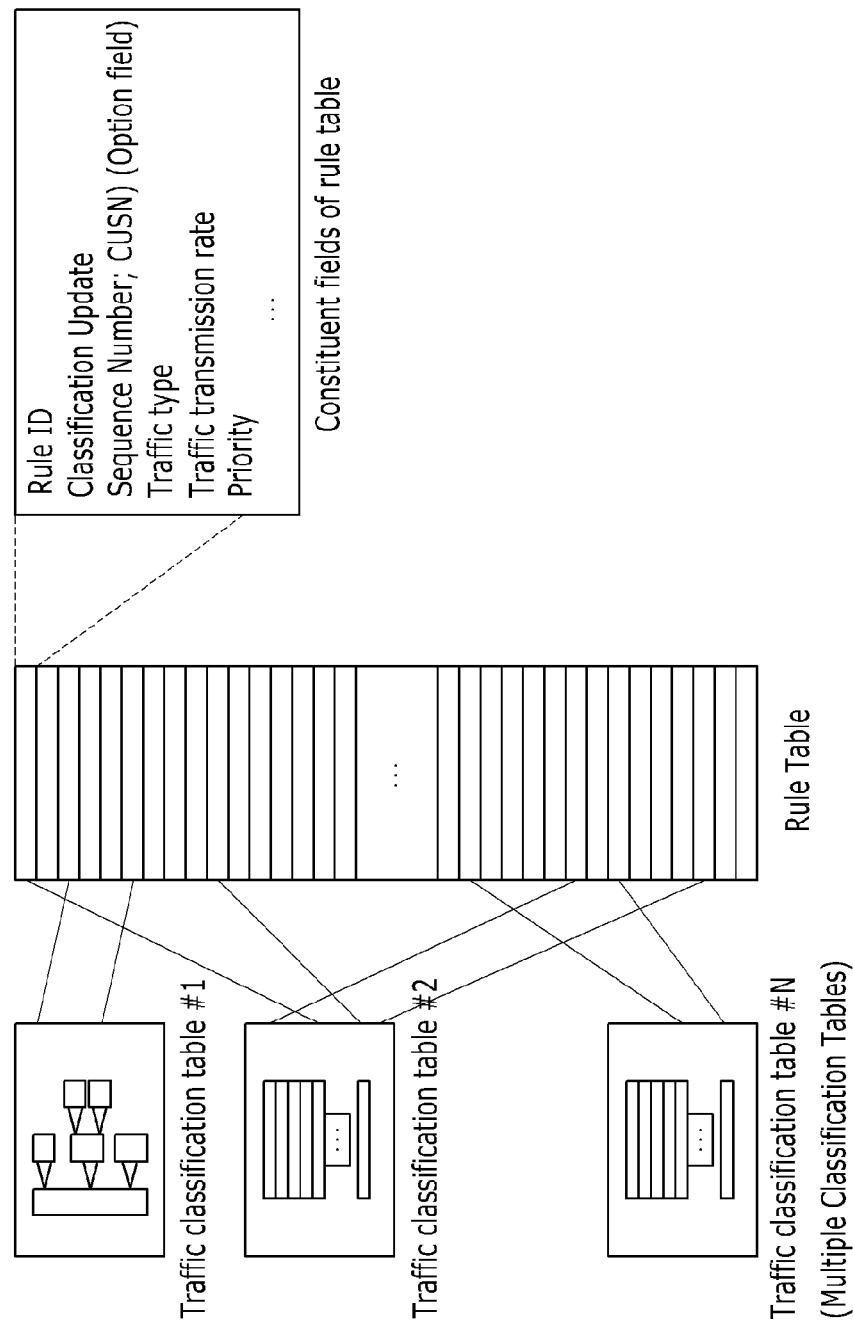
FIG. 4 is an exemplary diagram of a traffic classification table according to an exemplary embodiment of the present invention.

FIG. 3 is an exemplary diagram of a forwarding table according to an exemplary embodiment of the present invention and FIG. 4 is an exemplary diagram of a traffic classification table according to an exemplary embodiment of the present invention.

As shown in FIG. 3, the forwarding table may have various types of data structures including a tree structure, a hash structure, a direct table, a ternary content addressable memory (TCAM), a structure in which various data structures are merged, and the like. In addition, in the exemplary embodiment of the present invention, a unique route ID is allocated for each route in software configuring the forwarding information. For this, it will be described by assuming that a software block (not shown) is included in the forwarding table storing unit 300.

That is, when one route is added, the unique ID is allocated for each route and software provided to reflect the routing information acquired by the routing protocol to the forwarding information allocates the route ID in the case of the forwarding information. Herein, since the software is not necessarily implemented as any one type and may be varied in accordance with a design of a system, the limitation to the software will be omitted in the exemplary embodiment of the present invention.

In the case in which the forwarding information for the corresponding router is changed, a new route ID is not allocated and the same route ID is used, and in addition, a route update serial number for the corresponding route is just increased. In the case in which the route update occurs, the route update serial number of the route update validation table and the forwarding table is updated to a value increased by one. In this case, the update of the serial number may optionally be applied or not applied to the forwarding table. In the exemplary embodiment of the present invention, the number of bits for expressing the route ID should be large enough to express the total number of route entries which can be provided in the system.

The forwarding table shown in FIG. 3 has a multi-bit tree structure. If the forwarding table has a structure in which the route ID is allocated for each route, the forwarding table may satisfy an object according to the exemplary embodiment of the present invention. Herein, if the route update serial number is not given in the forwarding table, the given value may be used in the route update validation table of FIG. 5.

Next, the traffic classification table shown in FIG. 4 may have various types of data structures including a tree structure, a hash structure, a direct table, a ternary content addressable memory (TCAM), a structure in which various data structures are merged, and the like. In addition, a QoS software block (not shown) according to the exemplary embodiment of the present invention allocates a unique QoS rule ID for each of QoS rules. In this case, when an operator generally sets information through a command line interface (CLI), the QoS software block as a block for reflecting the set information to an actual table is not limited to any one form in the exemplary embodiment of the present invention.

The number of bits for expressing the QoS rule ID should be large enough to express the total number of QoS rules which can be provided in the system. FIG. 4 shows an exemplary embodiment of a configuration of the traffic classification table in the exemplary embodiment in FIG. 4, the plurality of traffic classification tables are shown. In addition, the plurality of traffic classification tables store a rule for each QoS rule ID and share a rule table with each other. That is, a final result of each traffic classification table has a pointer for the QoS rule table. However, this as one example according to the exemplary embodiment of the present invention may be generated as any type of data structure in which the traffic classification table can store the QoS rule for each QoS rule.

When the forwarding engine unit 100 of FIG. 1 is continuously described, the forwarding information according to the exemplary embodiment of the present invention includes the information including the route ID allocated to each forwarding entry, the route update serial number, and the like as shown in FIG. 3. If the route update serial does not exist in the forwarding table, a current RUSN value may be acquired by searching the route update validation table stored in the route update validation table storing unit 500 by using the route ID as a key value.

The QoS information according to the exemplary embodiment of the present invention includes a QoS rule ID allocated to the QoS rule, a QoS rule update serial number, and the like. If the QoS rule update serial number is not given in the traffic classification table, a current QUSN value can be acquired by searching the QoS rule update validation table stored in the QoS rule update validation table storing unit 600 by using the QoS rule ID as a key value. QoS The forwarding engine unit 100 performs the QoS processing and packet forwarding in accordance with the acquired forwarding information and QoS information.

In this case, the route update validation table and the QoS rule update validation table will first be described with reference to FIGS. 5 and 6.

Figure 5:
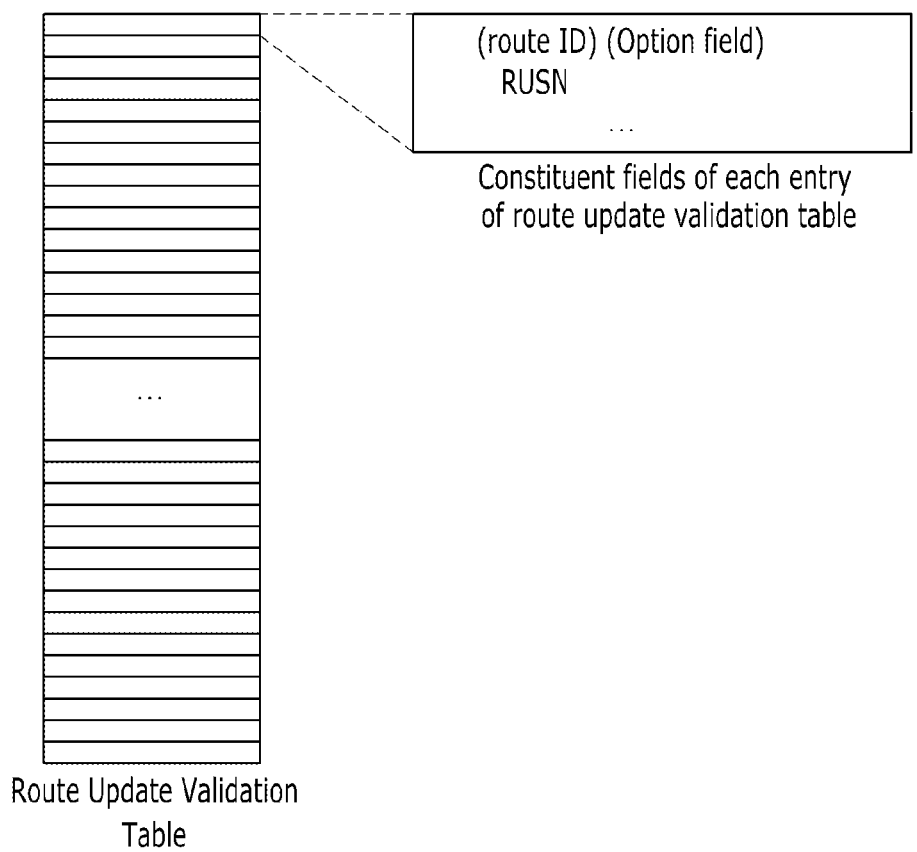
FIG. 5 is an exemplary diagram of a route update validation table according to an exemplary embodiment of the present invention.
Figure 6:
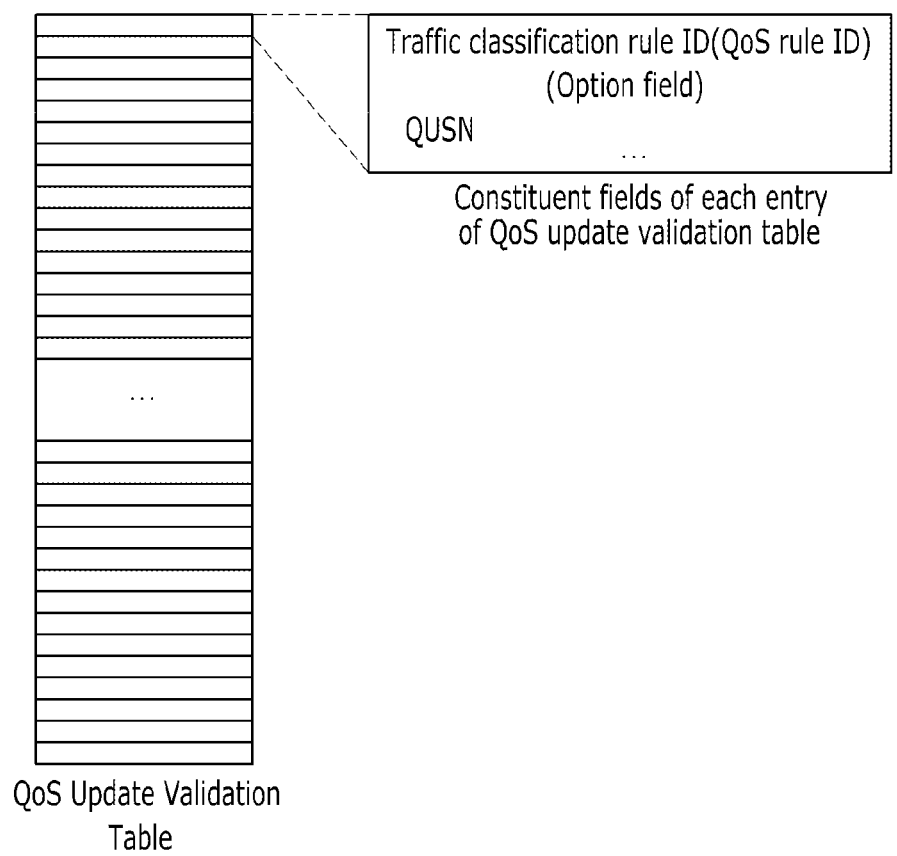
FIG. 6 is an exemplary diagram of a QoS rule update validation table according to an exemplary embodiment of the present invention.

FIG. 5 is an exemplary diagram of a route update validation table according to an exemplary embodiment of the present invention and FIG. 6 is an exemplary diagram of a QoS rule update validation table according to an exemplary embodiment of the present invention.

First, as shown in FIG. 5, the route update validation table may have various types of data structures including a hash structure, a direct table, a TCAM, a structure in which various data structures are merged, and the like. In addition, in the route update validation table according to the exemplary embodiment of the present invention, the route update serial number is increased whenever the route is updated for each route ID.

In this case, in the case in which problems in a search speed, and the like occurs due to the large number of routes, plural routes may have share the same route update serial number by abbreviating the route ID to the smaller number of bits.

Meanwhile, as shown in FIG. 6, the QoS rule update validation table may have various types of data structures including a hash structure, a direct table, a TCAM, a structure in which various data structures are merged, and the like. In addition, whenever the QoS rule is updated for each QoS rule ID, the QoS update serial number (QUSN) is increased.

If the search speed is slow due to the large number of QoS rules, actual plural QoS rule IDs may have the same QoS rule update serial number by abbreviating the QoS rule ID to the smaller number of bits.

A method for dynamically providing the forwarding information and the QoS information on the flow based network device will be described with reference to FIG. 7.

FIG. 7 is a flowchart illustrating a method for providing forwarding information and QoS information in a flow based network environment according to an exemplary embodiment of the present invention.

As shown in FIG. 7, when a packet for a predetermined flow is inputted into a flow based network device (S100), a forwarding engine unit 100 verifies whether or not the inputted packet is a firstly inputted packet (S110). A method for determining whether or not the inputted packet is the firstly inputted packet will be described below. Information on each flow is maintained in a flow table and the information of the flow, that is, status information is stored in the flow table.

That is, when the packet is inputted, the forwarding engine unit 100 verifies whether or not the status information of the packet exists in the flow table and the corresponding flow is present. During this process, if the status information of the flow does not exist in the flow table, the flow is not previously made and the packet at that time becomes the first packet.

If the packet is firstly inputted, a table of the corresponding flow is not stored in the flow table storing unit 200. Therefore, the forwarding engine unit 100 searches a forwarding table and a traffic classification table stored in a forwarding table storing unit 300 and a traffic classification table storing unit 400 to acquire the forwarding information and the QoS information, respectively (S120). In this case, the forwarding information and the QoS information for the flow may be stored in the flow table by using not the first data packet but a method for setting prior information through a control message.

When the forwarding information and the QoS information are acquired at step S120, the flow table is updated by storing the acquired forwarding information and QoS information in the flow table together with the status information of the corresponding packet (S130).

Meanwhile, if the inputted packet is not the first packet of the corresponding flow on the basis of the determination at step S110, first, the flow table stored in the flow table storing unit 200 is searched and a matched flow table entry is searched (S150). Thereafter, the forwarding information and QoS information stored in the flow table are acquired (S160) and on the basis of the acquired information, it is verified whether or not forwarding update or QoS rule update occurs (S170 and S180).

For this, first, the route update validation table is searched by using a route ID value read from the flow table as a key value in order to verify the forwarding update. The forwarding engine unit 100 compares a route update serial number acquired from the flow table with a route update serial number acquired by searching the route update validation table.

In addition, if the compared values are different from each other on the basis of the comparison result, it is determined that the forwarding information is updated and changed forwarding information is found by researching the forwarding table and again stored in the flow table (S190). However, if the compared values are the same as each other, the forwarding information is not updated and the existing serial number is just used.

When the forwarding update is verified, the forwarding engine unit 100 searches the QoS rule update validation table by using the QoS rule ID value read from the flow table as a key value in order to verify the update of the QoS information. In addition, the forwarding engine unit 100 compares the QoS rule update serial number acquired from the flow table with the QoS rule update serial number acquired by searching the QoS rule update validation table. In addition, if the compared values are different from each other, it is determined that the QoS information is changed and the changed QoS information is found by researching the traffic classification table and again stored in the flow table (S190).

The forwarding information and the QoS information may be dynamically applied on the flow based network device by using such a procedure to facilitate the processing of the flow.

According to the exemplary embodiment of the present invention, when new forwarding information and QoS information are updated after flow information is set at one time on a flow based network device, dynamically updated information can be applied and used.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for providing forwarding information and quality of service (QoS) information in a flow based network environment, the method comprising:
   acquiring first information and second information from a flow table of a network device on the basis of status information of a flow;
   determining whether or not the acquired first information and second information are updated on the basis of an ID read from the flow table; and
   updating the flow table when it is determined that the acquired first information and second information are updated,
   wherein the first information includes a route ID and a first route update serial number, and
   wherein the determining whether or not the acquired first information and second information are updated includes:
      verifying a second route update serial number stored in a route update validation table storing unit in the network device on the basis of the route ID;
      verifying whether the first route update serial number and the second route update serial number are the same as each other; and
      updating the first information in the flow table by determining that the first information is updated if the first route update serial number and the second route update serial number are different from each other.

2. The method of claim 1, further comprising:
   before acquiring the first information and the second information,
   determining whether or not a packet inputted for the flow is a firstly inputted packet; and
   acquiring information on the packet if the inputted packet is not the firstly inputted packet.

3. The method of claim 2, further comprising:
   after determining whether or not the inputted packet is the firstly inputted packet,
   acquiring the first information and second information previously stored in the network device if the inputted packet is determined to be the firstly inputted packet;
   storing and updating the acquired first and second information and status information of the firstly inputted packet in the flow table; and
   performing QoS processing and packet forwarding for the flow.

4. The method of claim 1, wherein:
   the first information is the forwarding information and the second information is the QoS information.

5. A device for providing forwarding information and QoS information in a flow based network environment, the device comprising:
   a table storing unit configured to store information for processing a packet for a flow and processing update information; and
   a forwarding engine unit configured to determine whether or not an inputted packet is a firstly inputted packet and update first information and second information on the basis of information previously stored in the table storing unit in accordance with status information of the inputted packet,
   wherein the table storing unit includes:
      a flow table storing unit configured to store the first information and the second information for processing the packet for the flow, and store a route ID, a route update serial number, a QoS rule ID, a QoS rule update serial number, and status information of the packet for the flow;
      a forwarding table storing unit including a software block in which a unique route ID is allocated to each router, and configured to store the first information including the route ID and the route update serial number generated through the software block; and
      a traffic classification table storing unit including a QoS software block in which a QoS rule ID is allocated, and configured to store the second information including the QoS rule ID and the QoS rule update serial number generated through the QoS software block, wherein the traffic classification table storing unit includes pointer information.

6. The device of claim 5, wherein:
   the table storing unit further includes,
   a route update validation table storing unit configured to update and store the route update serial number when a route is updated for each route ID; and
   a QoS rule update validation table storing unit configured to update and store the QoS update serial number when a QoS rule is updated for each QoS rule ID.

7. The device of claim 5, wherein:
   the QoS information includes at least one of a traffic classification rule ID applied to a corresponding flow, an applied traffic classification rule update serial number, a traffic type, a traffic transmission rate, bandwidth information of a packet, and priority information.

8. The device of claim 5, wherein:
   the first information further includes next hop information.

9. The device of claim 5, wherein:
   the first information is the forwarding information and the second information is the QoS information.

10. A method for providing forwarding information and quality of service (QoS) information in a flow based network environment, the method comprising:
- acquiring first information and second information from a flow table of a network device on the basis of status information of a flow;
- determining whether or not the acquired first information and second information are updated on the basis of an ID read from the flow table; and
- updating the flow table when it is determined that the acquired first information and second information are updated,
- wherein the second information includes a QoS rule ID and a first QoS rule update serial number, and
- wherein the determining whether or not the acquired first information and second information are updated includes:
  - verifying a second QoS rule update serial number stored in a QoS rule update validation table storing unit in the network device on the basis of the QoS rule ID;
  - verifying whether or not the first QoS rule update serial number and the second QoS rule update serial number are the same as each other; and
  - updating the second information in the flow table by determining that the second information is updated if the first QoS rule update serial number and the second QoS rule update serial number are different from each other.

11. The method of claim 10, further comprising:
- before acquiring the first information and the second information,
- determining whether or not a packet inputted for the flow is a firstly inputted packet; and
- acquiring information on the inputted packet if the inputted packet is not determined to be the firstly inputted packet.

12. The method of claim 11, further comprising:
- after determining whether or not the inputted packet is the firstly inputted packet,
- acquiring the first information and the second information previously stored in the network device if the inputted packet is determined to be the firstly inputted packet;
- storing and updating the acquired first and second information and status information of the firstly inputted packet in the flow table; and
- performing QoS processing and packet forwarding for the flow.

13. The method of claim 10, wherein:
the first information is the forwarding information and the second information is the QoS information.

* * * * *